United States Patent [19]
Buschur et al.

[11] Patent Number: 5,946,911
[45] Date of Patent: Sep. 7, 1999

[54] FLUID CONTROL SYSTEM FOR POWERING VEHICLE ACCESSORIES

[75] Inventors: Jeffrey J. Buschur, Bellbrook; Robert V. Eyink, Dayton, both of Ohio

[73] Assignee: Valeo Electrical Systems, Inc., Auburn Hills, Mich.

[21] Appl. No.: 08/779,769

[22] Filed: Jan. 7, 1997

[51] Int. Cl.$^6$ ................................................. F16D 31/02
[52] U.S. Cl. ............................. 60/424; 60/456; 60/468; 91/520
[58] Field of Search ................ 60/422, 424, 456, 60/468; 91/520

[56] References Cited

U.S. PATENT DOCUMENTS

| | | |
|---|---|---|
| B 535,386 | 1/1976 | Eftefield . |
| 2,500,627 | 3/1950 | Chinn . |
| 2,585,348 | 2/1952 | Robinson . |
| 3,641,879 | 2/1972 | Week et al. . |
| 3,664,129 | 5/1972 | Schwab ........................................ 60/468 |
| 4,005,636 | 2/1977 | Dunn . |
| 4,043,419 | 8/1977 | Larson et al. . |
| 4,075,840 | 2/1978 | Jesswein . |
| 4,130,990 | 12/1978 | Amedei et al. . |
| 4,144,946 | 3/1979 | Melocik . |
| 4,174,018 | 11/1979 | Liebert et al. . |
| 4,179,888 | 12/1979 | Goscenski, Jr. . |
| 4,189,919 | 2/1980 | Goscenski, Jr. . |
| 4,206,689 | 6/1980 | Peterson . |
| 4,223,646 | 9/1980 | Kinder . |
| 4,343,151 | 8/1982 | Lorimor . |
| 4,410,058 | 10/1983 | Dymond . |
| 4,414,809 | 11/1983 | Burris . |
| 4,420,934 | 12/1983 | Udono ........................................ 60/422 |
| 4,446,697 | 5/1984 | Goscenski, Jr. . |
| 4,463,557 | 8/1984 | Miller et al. . |
| 4,470,259 | 9/1984 | Miller et al. . |
| 4,488,569 | 12/1984 | Rau . |

(List continued on next page.)

FOREIGN PATENT DOCUMENTS

| | | |
|---|---|---|
| 0042682 | 12/1981 | European Pat. Off. . |
| 3626013 | 7/1986 | Germany . |
| 62-282110 | 12/1987 | Japan . |
| 63-141878 | 6/1988 | Japan . |
| 03179133 | 8/1991 | Japan . |
| 1522014 | 8/1978 | United Kingdom . |
| 7901084 | 12/1979 | WIPO . |
| 9616259 | 5/1996 | WIPO . |

OTHER PUBLICATIONS

"Hydraulic Multiverbrauchersysteme", *Technisce Rundschau*, No. 13, Mar. 29, 1993.

*Primary Examiner*—F. Daniel Lopez
*Attorney, Agent, or Firm*—J. Gordon Lewis

[57] ABSTRACT

A fluid control system for powering vehicle accessories includes a pump for generating a supply flow of hydraulic fluid, and a supply line for receiving the supply flow of hydraulic fluid. The system further includes a fan control circuit in fluid communication with the supply line, wherein the fan control circuit includes (1) a hydraulic motor and a bypass valve, and (2) the hydraulic motor is positioned in parallel with the bypass valve. The system also includes a steering control circuit in fluid communication with the fan control circuit, wherein (1) the steering control circuit requires a first predetermined flow of hydraulic fluid from the fan control circuit for proper operation thereof, and (2) the bypass valve and the hydraulic motor cooperate so as to create a second predetermined flow of hydraulic fluid. Moreover, the system includes a sensor for detecting operational pressure within the fluid supply line and generating pressure status signals in response thereto. In addition, the system includes an electronic control unit for generating valve control signals. The electronic control unit controls the bypass valve so that the second predetermined flow of hydraulic fluid is greater than or equal to in magnitude than the first predetermined flow. Moreover, operation of the bypass valve is dependent on the pressure status signals generated by the sensor.

19 Claims, 2 Drawing Sheets

U.S. PATENT DOCUMENTS

| | | |
|---|---|---|
| 4,556,078 | 12/1985 | Wittren . |
| 4,625,751 | 12/1986 | Gage . |
| 4,664,210 | 5/1987 | Yamaoka et al. . |
| 4,738,330 | 4/1988 | Suzuki et al. ............................ 180/141 |
| 4,798,050 | 1/1989 | Nakamura et al. ........................ 60/468 |
| 4,941,437 | 7/1990 | Suzuki et al. . |
| 4,966,066 | 10/1990 | Kauss et al. . |
| 5,293,952 | 3/1994 | Ledamoisel et al. . |
| 5,398,505 | 3/1995 | Oogushi et al. . |
| 5,471,908 | 12/1995 | Lech . |
| 5,487,403 | 1/1996 | Mollo . |
| 5,584,640 | 12/1996 | Johnson . |

FLUID CONTROL SYSTEM FOR POWERING VEHICLE ACCESSORIES

BACKGROUND OF THE INVENTION

The present invention relates generally to fluid circuits, and more particularly to a fluid control system for powering vehicle accessories such as a cooling fan and a power steering unit.

Many vehicles such as cars and trucks include a hydraulic-assisted steering linkage. These vehicles also include an engine cooling fan driven by a hydraulic motor. For economic reasons, it is known to provide an integrated fluid control circuit in these vehicles which includes both a fluid control circuit for operating an engine cooling fan, and a fluid control circuit for operating a hydraulic-assisted steering linkage. Such integrated fluid control circuits provide the necessary operational pressure for proper functioning of the fluid circuit with a single fluid pump. The use of a single fluid pump reduces costs associated with manufacturing the vehicle.

It is desirable to position the fluid components associated with the engine cooling fan in a series configuration with the fluid components associated with the hydraulic-assisted steering linkage. Such a series configuration creates a first pressure drop across the fluid components associated with the engine cooling fan and a second pressure drop across the fluid components associated with the hydraulic-assisted steering linkage. Such a configuration defines an integrated fluid control circuit wherein an output pressure on a fluid supply line of the single fluid pump fluctuates (i.e. rises and falls) as a function of the sum of the two pressure drops.

The pressure drop across each of the two groups of fluid components may vary widely depending on operating conditions associated with the vehicle. For example, on hot days the fluid pressure requirements associated with the engine cooling fan will increase. If during such a hot day the operator of the vehicle executes a steering maneuver that requires a large amount of fluid pressure (e.g. an abrupt, sharp turn), the sum of the two fluid pressure requirements may exceed the fluid pressure generating capabilities of the single fluid pump.

In such situations as described above wherein the fluid pressure requirements of the two groups of fluid components exceeds the pressure generating capabilities of the single fluid pump, it is desirable to give priority to the fluid components associated with the hydraulic-assisted steering linkage over the fluid components associated with the engine cooling fan. In particular, it is desirable to bypass fluid pressure around the fluid components associated with the engine cooling fan and direct the fluid pressure to the fluid components associated with the hydraulic-assisted steering linkage thereby reducing the speed of the engine cooling fan.

In addition, it is also desirable to control the overall fluid pressure of the integrated fluid control circuit. In particular, it is desirable to provide fluid pressure necessary to operate the fluid components associated with the engine cooling fan and the hydraulic-assisted steering linkage while not exceeding the operative range of the pressure generating capabilities of the single fluid pump.

What is needed therefore is an apparatus and method that gives priority to the advancement of fluid pressure to the fluid components associated with the hydraulic-assisted steering mechanism over the fluid components associated with the engine cooling fan which also controls the overall pressure associated with the integrated fluid control circuit.

SUMMARY OF THE INVENTION

In accordance with one embodiment of the present invention, there is provided a fluid control system for powering vehicle accessories. The system includes a pump for generating a supply flow of hydraulic fluid, and a supply line for receiving the supply flow of hydraulic fluid. The system further includes a fan control circuit in fluid communication with the supply line, wherein the fan control circuit includes (1) a hydraulic motor and a bypass valve, and (2) the hydraulic motor is positioned in parallel with the bypass valve. The system also includes a steering control circuit in fluid communication with the fan control circuit. Moreover, the system includes a sensor for detecting operational pressure within the fluid supply line and generating pressure status signals in response thereto. In addition, the system includes an electronic control unit for generating valve control signals. The electronic control unit controls the bypass valve so that the bypass flow of hydraulic fluid is controlled by the status signals generated by the sensor. Moreover, operation of the bypass valve is dependent on the pressure status signals generated by the sensor.

In accordance with a second embodiment of the present invention, there is provided a fluid control system for powering vehicle accessories. The system includes a pump for generating a supply flow of hydraulic fluid, and a supply line for receiving the supply flow of hydraulic fluid. The system also includes a fan control circuit in fluid communication with the supply line. Moreover, the system includes a steering control circuit in fluid communication with the fan control circuit. The system yet further includes a sensor for detecting operational pressure within the fluid supply line and generating pressure status signals in response thereto.

In accordance with a third embodiment of the present invention, there is provided a fluid control system for powering vehicle accessories. The system includes means for generating a supply flow of hydraulic fluid, and a supply line for receiving the supply flow of hydraulic fluid. The system further includes means for controlling rotational speed of a fan, the fan controlling means being in fluid communication with the supply line. Moreover, the system includes means for assisting movement of a steering linkage, the steering linkage movement means being in fluid communication with the fan controlling means. Also, the system includes means for detecting operational pressure within the fluid supply line and generating pressure status signals in response thereto.

In accordance with a fourth embodiment of the present invention, there is provided a method for powering a fan and a steering unit. The method includes the steps of generating a supply flow of hydraulic fluid in a supply line, and operating a fan with a fan control circuit which is in fluid communication with the supply line. The method also includes the steps of operating a steering control unit with a steering control circuit which is in fluid communication with the fan control circuit, and detecting operational pressure within the fluid supply line and generating pressure status signals in response thereto.

It is another object of the present invention to provide an improved fluid control system for powering vehicle accessories.

It is a further object of the present invention to a new and useful method for powering a fan and a steering unit.

It is moreover an object of the present invention to provide an improved method for powering a fan and a steering unit.

It is yet another object of the present invention to provide a fluid control system for powering vehicle accessories which can give priority to the advancement of fluid pressure to the fluid components associated with the hydraulic-assisted steering mechanism over the fluid components associated with the engine cooling fan.

It is still further an object of the present invention to provide a fluid control system for powering vehicle accessories which controls the overall pressure associated with the fluid control system.

The above and other objects, features, and advantages of the present invention will become apparent from the following description and the attached drawings.

DETAILED DESCRIPTION OF THE INVENTION

Figure 1:
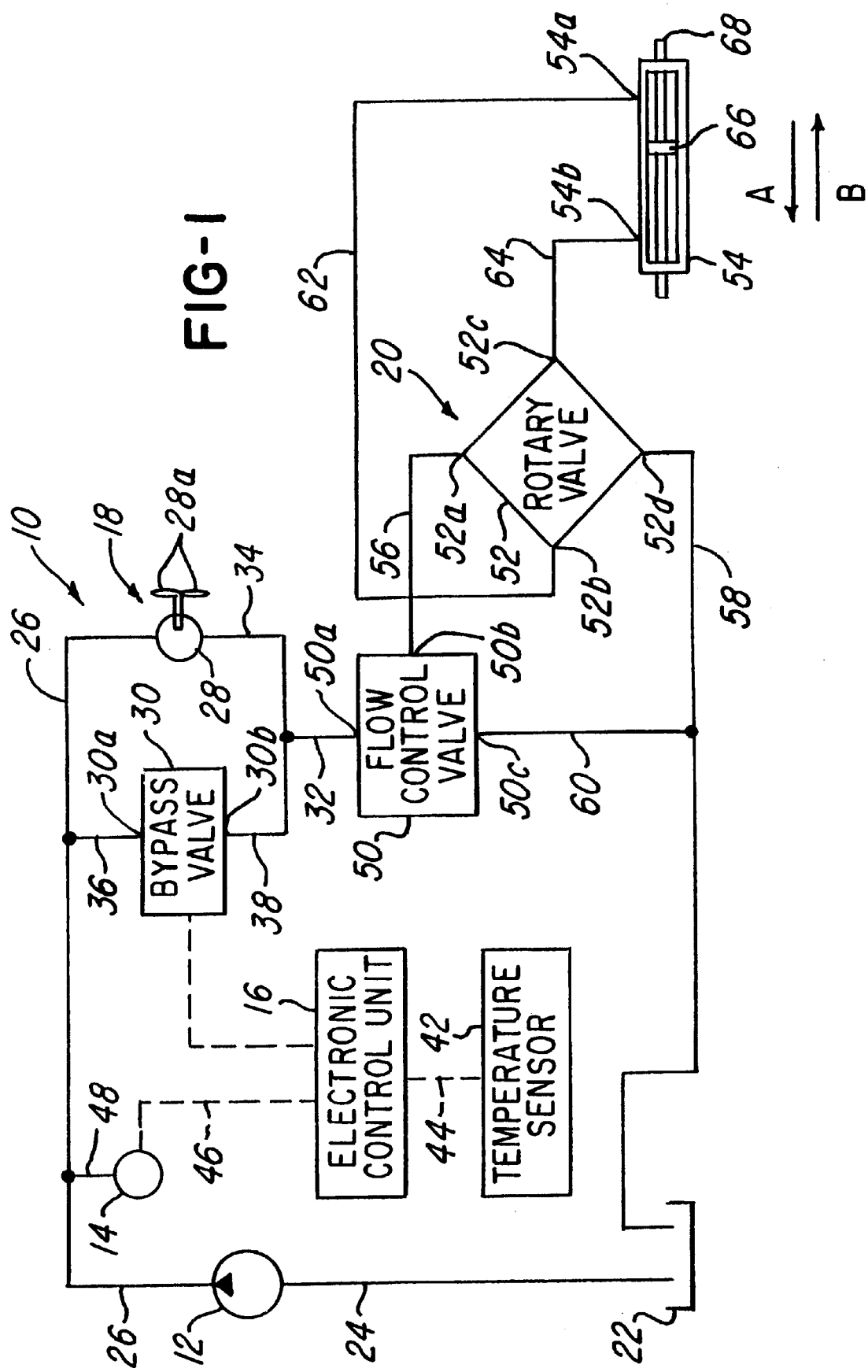
FIG. 1 is a schematic diagram of a first embodiment of a fluid control system which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown an integrated vehicle fluid control system 10. The fluid control system 10 includes an operational pressure source or fluid pump 12, a pressure sensor 14, an electronic control unit 16, a fan control circuit 18, and a steering control circuit 20.

The fluid pump 12 is operatively coupled to and powered by an engine of a vehicle such as a car or truck (not shown). The fluid pump 12 advances an operation fluid such as hydraulic fluid from a reservoir 22. In particular, an inlet of the fluid pump 12 is coupled to the reservoir 22 via a fluid line 24. An outlet of the fluid pump 12 is coupled to a fluid supply line 26. Hence, operational pressure is created by the flow of operation fluid through the fluid pump 12 and is transmitted via the fluid supply line 26 thereby providing the motive power for the various fluid components associated with the fluid control system 10.

The fan control circuit 18 includes a fan motor 28 and a bypass valve 30. The fan motor 28 is a fluid powered fan motor which is in fluid communication with the fluid pump 12. In particular, an inlet of the fan motor 28 is coupled to the outlet of the fluid pump via the fluid supply line 26. Hence, operational pressure transmitted via the fluid supply line 26 rotates or otherwise powers the fan motor 28. The fan motor 28 includes a number of fan blades 28a operatively coupled thereto. Rotation of the fan motor 28 causes the fan blades 28a to be likewise rotated thereby creating a flow of air which is used to cool the engine of the vehicle (not shown).

Exhausted or spent operation fluid from the fan motor 28 is exhausted from an outlet thereof. In particular, the outlet of the fan motor 28 is coupled to a fluid inlet line 32 of the steering control circuit 20 via a fluid line 34.

It should be appreciated that if the magnitude of the operational pressure exerted on the fan motor 28 is increased, the rotational speed of the fan blades 28a will likewise be increased. Conversely, if the magnitude of the operational pressure exerted on the fan motor 28 is decreased, the rotational speed of the fan blades 28a will likewise be decreased.

The bypass valve 30 is arranged in a parallel flow relationship with the fan motor 28. More specifically, an inlet 30a of the bypass valve 30 is coupled to the fluid supply line 26 via a bypass fluid line 36, whereas an outlet 30b of the bypass valve 30 is coupled to the fluid inlet line 32 of the steering control circuit 20 via a bypass fluid line 38.

The bypass valve 30 is an electrically-actuated, multi-position bypass valve. The bypass valve 30 is electrically coupled to the electronic control unit 16 via an electrical signal line 40. The electronic control unit 16 executes control logic which selectively generates a number of valve control signals on the signal line 40. As a state of the control signal is changed, the bypass valve 30 is switched between a number of different valve positions. Each of the valve positions causes a flow of operation fluid of a different magnitude to be advanced through the bypass valve 30. Hence, by changing the state of the valve control signals, the electronic control unit 16 can either increase or decrease the magnitude of the flow of operation fluid being advanced through the bypass valve 30 thereby decreasing or increasing, respectively, the magnitude of the operational pressure exerted on the fan motor 28.

The electronic control unit 16 is in electrical communication with the pressure sensor 14. In particular, the electronic control unit 16 is electrically coupled to the pressure sensor 14 via an electrical signal input line 46. Moreover, the pressure sensor 14 is in fluid communication with the fluid supply line 26. In particular, the pressure sensor 14 is coupled to the fluid supply line 26 via a pressure sensing line 48. Therefore, the magnitude of the operational pressure on the fluid supply line 26 is sensed by the pressure sensor 14. It should be appreciated that the operational pressure on the fluid supply line 26 is indicative of the total pressure requirements or load being placed on the fluid pump 12 by the fluid control system 10.

The magnitude of the operational pressure on the fluid supply line 26 is encoded into an electrical status signal which is transmitted to the electronic control unit 16 via the signal line 46 for use by control logic thereof. The pressure sensor 14 may be any known electronic pressure sensor. For example, the pressure sensor 14 may be a model number 3CP2-4 pressure sensor which is commercially available from Texas Instruments, Incorporated of Dallas, Tex.

In addition, the electronic control unit 16 is in electrical communication with a temperature sensor 42 disposed in the engine of the vehicle (not shown). In particular, the electronic control unit 16 is electrically coupled to the temperature sensor 42 via an electrical signal input line 44. The temperature sensor 42 senses the temperature of the engine during operation thereof. The sensed temperature is then encoded into an electrical signal by the temperature sensor 42, and thereafter transmitted to the electronic control unit 16 for use by control logic thereof.

Hence, control logic of the electronic control unit 16 can control the magnitude of a bypass flow of operation fluid advancing through the bypass valve 30 in response to a number of variables. For example, control logic of the electronic control unit 16 may change the state of the valve control signals transmitted to the bypass valve 30 in response to (1) engine temperature, (2) rate of change of the engine temperature, (3) engine temperature history (e.g. the amount of time over a given period at which the engine temperature has exceeded a predetermined magnitude), and (4) the operational pressure in the fluid supply line 26.

The steering control circuit 20 includes a flow control valve 50, a rotary valve 52, and a fluid cylinder 54. The fluid cylinder 54 includes a piston 66 coupled to a shaft 68. A first end of the shaft 68 is coupled to a first portion of a steering linkage (not shown) of the vehicle, whereas a second end of the shaft is coupled to a second portion of the steering linkage (not shown) of the vehicle. Movement of the shaft 68 provides the motive power for moving the steering linkage thereby reducing the amount of force which the operator of the vehicle must exert on a steering wheel of the vehicle in order to steer the vehicle.

The steering control circuit 20 is in fluid communication with the fan control circuit 18. In particular, an inlet 50a of the flow control valve 50 is coupled to the fan motor 28 via a fluid path which includes the fluid line 34 and the inlet line 32, whereas the inlet 50a is coupled to the bypass valve 30 via a fluid path which includes the fluid bypass line 38 and the fluid inlet line 34.

The flow control valve 50 is arranged in fluid communication with the rotary valve 52 and the reservoir 22. More specifically, an operation outlet 50b of the flow control valve 50 is coupled to an inlet 52a of the rotary valve 52 via a fluid line 56, whereas an exhaust outlet 50c of the flow control valve 50 is coupled to the reservoir 22 via a fluid path which includes an exhaust line 60 and a drain line 58.

The flow control valve 50 directs a flow of a first predetermined magnitude to the rotary valve 52. In particular, a flow of a second predetermined magnitude is advanced from the fan control circuit 18 to the inlet 50a of the flow control valve 50 wherein the flow control valve 50 directs a flow of the first predetermined magnitude to the inlet 52a of the rotary valve 52, whereas the remainder of the operation fluid advancing through the flow control valve 50 is exhausted to the reservoir 22 via the exhaust outlet 50c. The flow control valve may be any type valve which is capable of separating the operation fluid advancing therethrough into the aforementioned flows. For example, the flow control valve 50 may be a known spring actuated pressure relief bypass valve. The pressure relief setting of this valve 50 would determine the maximum pressure level of steering system 20.

The rotary valve 52 is operatively coupled to a steering column of the vehicle. More specifically, if the steering wheel and hence the steering column of the vehicle is rotated in a leftwardly direction, operation fluid is advanced from the inlet 52a through a left outlet 52b. Thereafter, operation fluid is advanced to a fluid port 54a of the fluid cylinder 54 via fluid line 62 thereby urging the piston 66 and hence the shaft 68 in the general direction of arrow A of FIG. 1. It should be noted that movement of the shaft in the general direction of arrow A assists the operator of the vehicle in executing a leftward turn of the steering linkage of the vehicle (not shown).

Spent or exhausted operation fluid is then advanced from the fluid cylinder 54 via a fluid port 54b and thereafter is advanced back to the rotary valve 52 via a fluid line 64. After which, spent operation fluid is exhausted from the rotary valve 52 through the exhaust outlet 52d and is advanced to the reservoir 22 via the drain line 58.

Conversely, if the steering wheel and hence the steering column of the vehicle is rotated in a rightwardly direction, operation fluid is advanced from the inlet 52a through a right outlet valve 52c. Thereafter, operation fluid is advanced to the fluid port 54b of the fluid cylinder 54 thereby urging the piston 66 and hence the shaft 68 in the general direction of arrow B of FIG. 1. It should be noted that movement of the shaft in the general direction of arrow B assists the operator of the vehicle in executing a rightward turn of the steering linkage of the vehicle (not shown).

Spent or exhausted operation fluid is then advanced from the fluid cylinder 54 via the fluid port 54a and thereafter is advanced back to the rotary valve 52 via the fluid line 62. After which, spent operation fluid is exhausted from the rotary valve 52 through the exhaust port 52d and is advanced to the reservoir 22 via the drain line 58.

In operation, operation fluid is advanced from the fluid pump 12 to the fan control circuit 18. The electronic control unit 16 receives data from the temperature sensor 42 and the pressure sensor 14 via the electrical signal lines 44 and 46, respectively. If control logic of the electronic control unit 16 determines that the engine of the vehicle is in need of an augmented air flow (e.g. the engine temperature is above a predetermined control limit), a valve control signal will be generated on the electrical signal line 40 thereby reducing the magnitude of the flow of operation fluid advancing through the bypass valve 30. Hence, operational pressure exerted on the fan motor 28 will be increased thereby increasing the rotational speed of the fan motor 28.

When the fan motor 28 is operated at a high speed, a larger operational pressure drop occurs across the fan control circuit 18 than when the fan motor 28 is operated at a low speed thereby increasing the magnitude of the operational pressure which the fluid pump 12 must generate in order to also supply operational pressure to the steering control circuit 20.

If the operational pressure sensed on the fluid supply line 26 exceeds a threshold amount, control logic of the electronic control unit 16 reduces the rotational speed of the fan motor 28 by generating a valve control signal on the electrical signal line 40 so as to cause the amount of operation fluid advancing through the bypass valve 30 to be increased. Hence, the pressure drop across the fan control circuit 18 is reduced thereby providing adequate operational pressure for operating the steering control circuit 20. It should be appreciated that the threshold amount is, preferably, set to a threshold level which will provide some operation of the fan control circuit, even under the most extreme operational conditions of steering circuit 20, as mentioned earlier herein.

Figure 2:
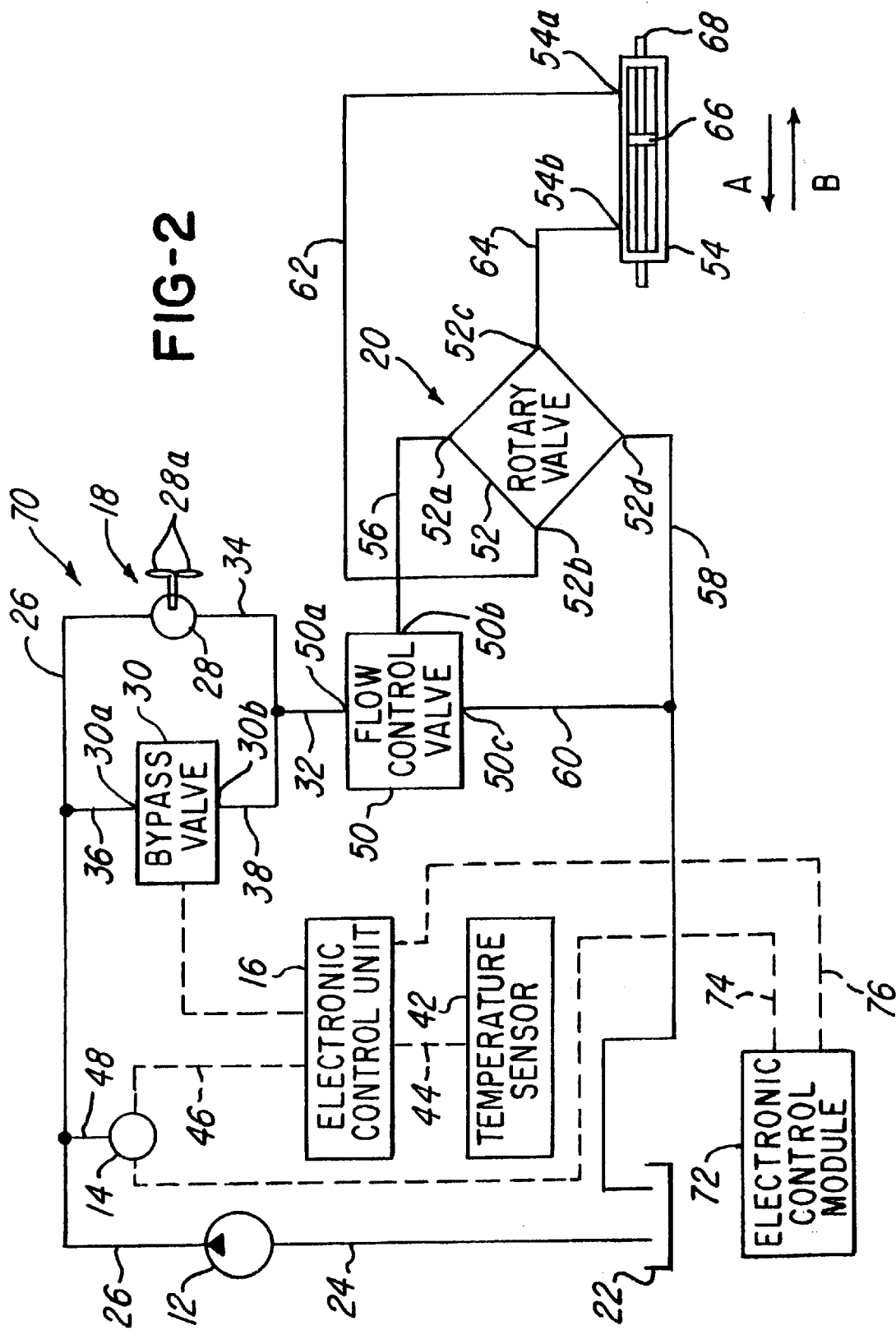
FIG. 2 is a schematic diagram of a second embodiment of the fluid control system of FIG. 1.

Referring now to FIG. 2, there is shown an integrated vehicle fluid control system 70. The same reference numerals are used in FIG. 2 to designate common components which were previously discussed in regard to FIG. 1. Therefore, no further discussion thereof is warranted.

A control module 72 is included in the fluid control system 70. The control module 72 may be either a known engine control module (ECM), a known power train control module (PCM), or a known vehicle control module (VCM). The control module 72 controls many of the functions relating to operation of the vehicle. For example, the control module 72 may control engine idle speed, engine fuel-to-air ratio, and shifting of an automatic transmission.

The control module 72 is in electrical communication with the pressure sensor 14 and the electronic control unit 16. In particular, the control module 72 is electrically coupled to the pressure sensor 14 via a data line 74, whereas the control module 72 is electrically coupled to the electronic control unit 16 via a data line 76. Hence, a data link is established whereby (1) operational pressure within the fluid supply line 26 is communicated to the control module 72, and (2) control instruction signals may be transmitted to the electronic control unit 16.

This data link provides feedback information which may be useful for variably controlling fan speed by, for example, slowing the fan speed down during increased steering pressure requirements. In contrast, prior art systems responded to increased steering pressure requirements by shutting the A/C compressor off and/or increase engine idle speed.

During periods of time when the pressure sensor 14 senses increasing operational pressure on the fluid supply line 26, the control module 72 adjusts certain parameters. In particular, since the increased load on the fluid pump 12 will likewise place an increased load on the engine of the vehicle, the control module 72 increases the engine idle so as to smooth operation of the vehicle during an idling condition. Thereafter, when the pressure sensor 14 senses a decreasing operational pressure on the fluid supply line 26, the control module 72 adjusts the engine idle back to its original setting.

In addition, the control module 72 may also cooperate with control logic of the electronic control unit 16 during certain vehicle operating conditions. In particular, when maximum engine power is needed (e.g. during a period of high vehicle acceleration), instruction signals are transmitted to the electronic control unit 16 via the data line 76 thereby reducing the speed of the fan motor 28. Such a reduction in speed of the fan motor 28 reduces the load on the fluid pump 12 thereby increasing the amount of the vehicle's engine power which may be used by other components thereof (e.g. a drive train of the vehicle in the case of high vehicle acceleration).

As described, the fluid control circuit 10, 70 gives priority to the steering control circuit 20 over the fan control circuit 18 while maintaining the overall pressure load exerted on the fluid pump within an operative range of the pressure generating capabilities of the fluid pump 12.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A fluid control system for powering vehicle accessories, comprising:
    a pump for generating a supply flow of hydraulic fluid;
    a supply line for receiving said supply flow of hydraulic fluid;
    a fan control circuit in fluid communication with said supply line, wherein said fan control circuit includes (1) a hydraulic motor and a bypass valve, and (2) said hydraulic motor is positioned in parallel with said bypass valve;
    a steering control circuit in fluid communication with said fan control circuit;
    a sensor for detecting operational pressure of a summation of the pressure across the fan control circuit and said steering control circuit within said fluid supply line and generating pressure status signals in response thereto and
    an electronic control unit for generating valve control signals,
    wherein said electronic control unit controls said bypass valve so that pressure is produced at said supply line controlled by the electronic control unit in response to said pressure status signals.

2. The system of claim 1, wherein:
    said steering control circuit includes a rotary valve, a fluid cylinder, and a flow control valve,
    said rotary valve is operatively coupled to a steering column,
    said rotary valve includes an inlet, a first directional outlet, a second directional outlet, and an exhaust outlet,
    said flow control valve includes an inlet, an operation outlet, and an exhaust outlet,
    said fluid cylinder includes a first fluid port and a second fluid port,
    said inlet of said flow control valve is connected to an outlet of said bypass valve;
    said operation outlet of said flow control valve is connected to said inlet of said rotary valve,
    said exhaust outlet of said flow control valve is connected to a reservoir,
    said first directional outlet of said rotary valve is connected to said first fluid port of said fluid cylinder,
    said second directional outlet of said rotary valve is connected to said second fluid port of said fluid cylinder, and
    said exhaust outlet of said rotary valve is connected to said reservoir.

3. The system of claim 1, further comprising a control module for generating instruction signals, wherein:
    said control module is electrically connected to said sensor so as to receive said pressure status signals,
    said electronic control unit is electrically coupled to said control module so as to receive said instruction signals, and
    said electronic control unit generates said valve control signals based upon said instruction signals.

4. A fluid control system for powering vehicle accessories, comprising:
    a pump for generating a supply flow of hydraulic fluid;
    a supply line for receiving said supply flow of hydraulic fluid;
    a fan control circuit in fluid communication with said supply line;
    a steering control circuit in fluid communication with said fan control circuit; and
    a sensor for detecting operational pressure across both the fan control circuit and steering control circuit within said fluid supply line and generating pressure status signals in response thereto.

5. The system of claim 4, wherein:
    said fan control circuit includes a hydraulic motor and a bypass valve,
    said hydraulic motor is positioned in parallel with said bypass valve, and
    operation of said bypass valve is dependent on said pressure status signals generated by said sensor.

6. The system of claim 5, further comprising an electronic control unit for generating valve control signals, wherein:
    said bypass valve is electrically connected to said electronic control unit so as to receive said valve control signals,
    said electronic control unit is electrically coupled to said sensor so as to receive said pressure status signals, and
    said electronic control unit generates said valve control signals based upon said pressure status signals.

7. The system of claim 6, further comprising a control module for generating instruction signals, wherein:

said control module is electrically connected to said sensor so as to receive said pressure status signals, said electronic control unit is electrically coupled to said control module so as to receive said instruction signals, and said electronic control unit generates said valve control signals based upon said instruction signals.

8. The system of claim 4, wherein said system further comprises:

an electronic control unit coupled to said sensor for controlling a bypass valve to provide a bypass flow in response to operational pressures detected by said sensor.

9. The system of claim 8, wherein:

said steering control circuit includes a rotary valve, a fluid cylinder, and a flow control valve, said rotary valve is operatively coupled to a steering column, said rotary valve includes an inlet, a first directional outlet, a second directional outlet, and an exhaust outlet, said flow control valve includes an inlet, an operation outlet, and an exhaust outlet, said fluid cylinder includes a first fluid port and a second fluid port, said inlet of said flow control valve is connected to an outlet of said bypass valve;

said operation outlet of said flow control valve is connected to said inlet of said rotary valve, said exhaust outlet of said flow control valve is connected to a reservoir, said first directional outlet of said rotary valve is connected to said first fluid port of said fluid cylinder, said second directional outlet of said rotary valve is connected to said second fluid port of said fluid cylinder, and said exhaust outlet of said rotary valve is connected to said reservoir.

10. A fluid control system for powering vehicle accessories, comprising:

means for generating a supply flow of hydraulic fluid;

a supply line for receiving said supply flow of hydraulic fluid;

means for controlling rotational speed of a fan, said fan controlling means being in fluid communication with said supply line;

means for assisting movement of a steering linkage, said steering linkage movement means being in fluid communication with said fan controlling means; and means for detecting operational pressure of a summation of the pressure across the fan controlling means and said steering linkage movement means within said fluid supply line and generating pressure status signals in response thereto.

11. The system of claim 10, wherein:

said fan controlling means includes a fan control circuit in fluid communication with said supply line, wherein said fan control circuit (1) includes a hydraulic motor and a bypass valve, (2) said hydraulic motor is positioned in parallel with said bypass valve, and (3) operation of said bypass valve is dependent on said pressure status signals generated by said sensor;

said steering linkage movement means includes a steering control circuit in fluid communication with said fan control circuit; and said detecting means includes a sensor which detects operational pressure within said fluid supply line and generates pressure status signals in response thereto.

12. The system of claim 11, further comprising means for generating valve control signals, wherein:

said bypass valve is electrically connected to said valve control signal generating means so as to receive said valve control signals, said valve control signal generating means is electrically coupled to said detecting means so as to receive said pressure status signals, and said valve control signal generating means generates said valve control signals based upon said pressure status signals.

13. The system of claim 12, wherein:

said steering control circuit requires a first predetermined flow of hydraulic fluid from said fan control circuit for proper operation thereof, said bypass valve and said hydraulic motor cooperate so as to create a second predetermined flow of hydraulic fluid, and said valve control signal generating means controls said bypass valve so that said second predetermined flow of hydraulic fluid is greater than or equal to in magnitude than said first predetermined flow.

14. The system of claim 13, wherein:

said steering control circuit includes a rotary valve, a fluid cylinder, and a flow control valve, said rotary valve is operatively coupled to a steering column, said rotary valve includes an inlet, a first directional outlet, a second directional outlet, and a exhaust outlet, said flow control valve includes an inlet, an operation outlet, and an exhaust outlet, said fluid cylinder includes a first fluid port and a second fluid port, said inlet of said flow control valve is connected to an outlet of said bypass valve;

said operation outlet of said flow control valve is connected to said inlet of said rotary valve, said exhaust outlet of said flow control valve is connected to a reservoir, said first directional outlet of said rotary valve is connected to said first fluid port of said fluid cylinder, said second directional outlet of said rotary valve is connected to said second fluid port of said fluid cylinder, and said exhaust outlet of said rotary valve is connected to said reservoir.

15. The system of claim 12, further comprising a means for generating instruction signals for input to said valve control signal generating means, wherein:

said instruction signal generating means is electrically connected to said detecting means so as to receive said pressure status signals, said valve control signal generating means is electrically coupled to said instruction signal generating means so as to receive said instruction signals, and said valve control signal generating means generates said valve control signals based upon said instruction signals.

16. A method for powering a fan and a steering unit, comprising the steps of:

generating a supply flow of hydraulic fluid in a supply line;

operating a fan with a fan control circuit which is in fluid communication with the supply line;

operating a steering control unit with a steering control circuit which is in fluid communication with the fan control circuit; and detecting operational pressure across said fan control circuit and steering control circuit within the fluid supply line and generating pressure status signals in response thereto.

17. The method of claim 16, wherein the fan control circuit includes a hydraulic motor and a bypass valve, further comprising the step of operating the bypass valve based on the pressure status signals generated by the sensor.

18. The method of claim 17, wherein (1) the steering control circuit requires a first predetermined flow of hydraulic fluid from the fan control circuit for proper operation thereof, and (2) the bypass valve and the hydraulic motor cooperate so as to create a second predetermined flow of hydraulic fluid, further comprising the step of:

controlling the bypass valve so that the second predetermined flow of hydraulic fluid is greater than or equal to in magnitude than the first predetermined flow.

19. The method of claim 18, wherein the bypass valve controlling step includes the steps of:

generating instruction signals with a control module which are based on the pressure status signals; and generating valve control signals with a electronic control unit which are based on the instruction signals; and operating the bypass valve based on the valve control signals.

* * * * *